United States Patent [19]
Lewis

[11] 3,966,278
[45] June 29, 1976

[54] LUBRICATED SELF-ALIGNING BEARING ASSEMBLY

[75] Inventor: John G. Lewis, Dellwood, Mo.

[73] Assignee: Emerson Electric Co., St. Louis, Mo.

[22] Filed: Nov. 13, 1974

[21] Appl. No.: 523,344

[52] U.S. Cl. .................................. 308/72; 308/106
[51] Int. Cl.² ................... F16C 11/06; F16C 23/04; F16C 25/04; F16N 7/12
[58] Field of Search ............................ 308/72, 106

[56] References Cited
UNITED STATES PATENTS

| | | | |
|---|---|---|---|
| 2,011,493 | 8/1935 | Larsh | 308/72 |
| 3,002,794 | 10/1961 | Bluemink | 308/72 |
| 3,416,847 | 12/1968 | Daley et al. | 308/72 X |
| 3,649,092 | 3/1972 | Coleman | 308/72 |
| 3,866,986 | 2/1975 | Holper | 308/72 |

FOREIGN PATENTS OR APPLICATIONS

| | | | |
|---|---|---|---|
| 862,009 | 3/1961 | United Kingdom | 308/72 |

*Primary Examiner*—Albert J. Makay
*Assistant Examiner*—Howard Beltran
*Attorney, Agent, or Firm*—Charles E. Markham

[57] ABSTRACT

A spherical bearing is yieldably held firmly on a rigid annular seat by a high-rate leaf spring having a flanged central opening forming a second annular seat engaging another portion of the bearing. The leaf spring includes portions extending oppositely from the central opening, which portions are stressed and underlie diametrically opposed retaining lugs. The leaf spring is assembled by flexing the extending portions and rotation into position under the lugs.

5 Claims, 7 Drawing Figures

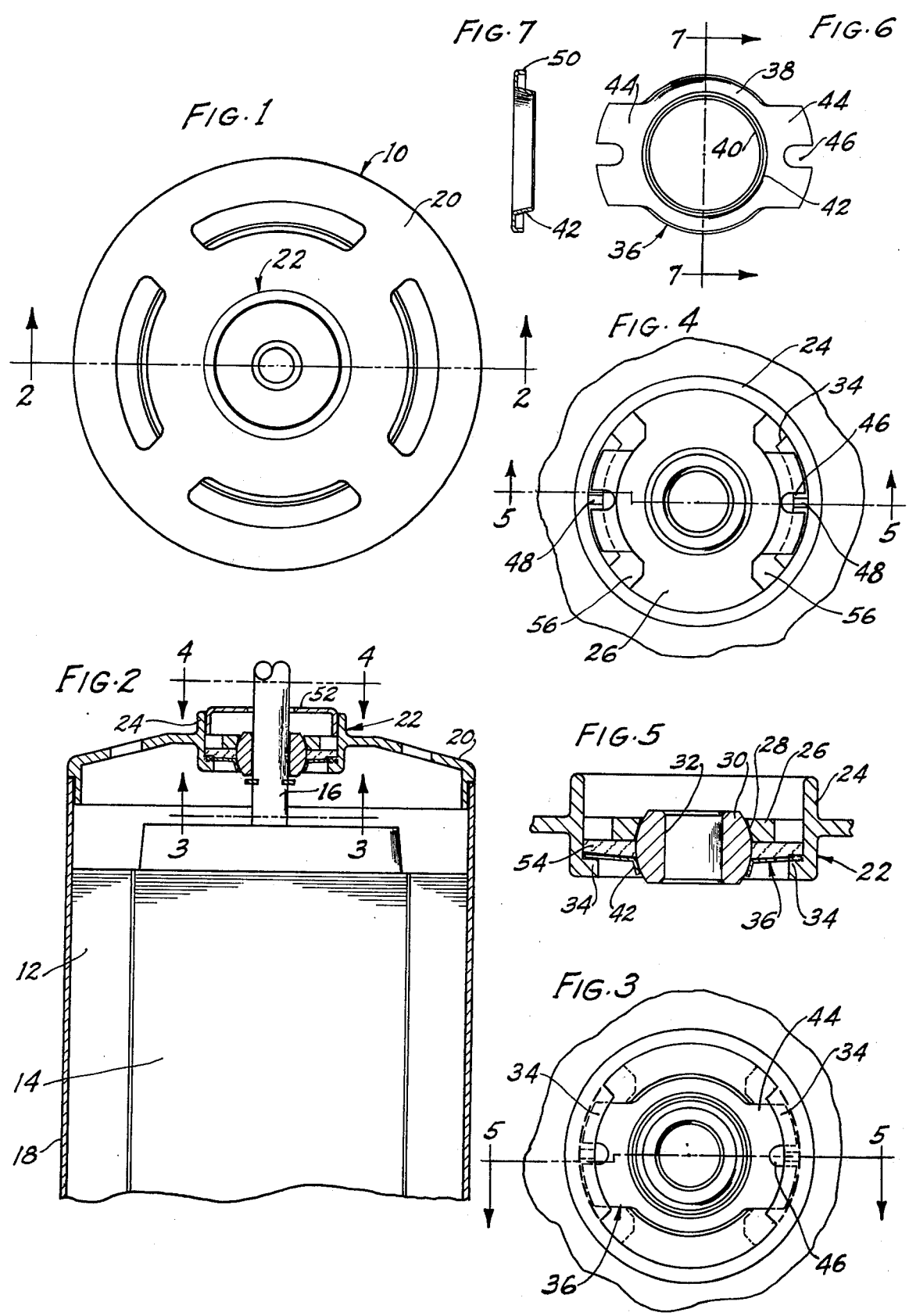

LUBRICATED SELF-ALIGNING BEARING ASSEMBLY

This invention relates to spherical bearing assemblies for electric motors or the like, and particularly to means for yieldably holding the bearing on its seat against forces occurring in operation tending to displace it therefrom.

Forces acting transversely to the axis of an electric motor drive shaft journalled in a spherical bearing, as would occur when driving a load through a belt pulley, may cause the bearing to climb out of its seat unless the means retaining the bearing on its seat is applying sufficient force to prevent it. Such displacement of the bearing from its seat, which is usually tapered or of spherical form, results in transverse displacement of that end of the shaft journalled therein.

In an electric motor, any transverse displacement of the drive shaft adversely affects the uniformity of the critical annular air gap between the rotor and stator and results in vibration and loss of efficiency of operation. It is, therefore, of particular importance when employing spherical bearings in electric motors that sufficient force is applied to maintain the bearing in contact with its seat when operating under load, at the same time permitting the bearing to move rotatably on its seat to attain precise axial alignment of its bearing surface with the shaft.

It is an object of this invention to provide a generally new and improved spherical bearing assembly for electric motors which is of particularly simple and economical construction, convenient to assemble, and effective to maintain alignment of the motor shaft under load, while permitting the movement of the bearing on its seat necessary to align its bearing surface with the shaft.

A further object is to provide a spherical bearing assembly in which a high-rate leaf spring is employed to yieldably retain the bearing on its seat.

A further object is to provide a spherical bearing assembly wherein one end of a spherical bearing is yieldably held on a rigid annular seat by a high-rate leaf spring lying transversely across the other end thereof and wherein the leaf spring is assembled by flexing and rotating it into a position in which the ends thereof engage diametrically opposed lugs which retain the spring in a stressed condition.

Further objects and advantages will appear from the following description when read in connection with the accompanying drawing.

In the drawing:

FIG. 1 is an end view of an electric motor incorporating a spherical bearing assembly constructed in accordance with the present invention;

FIG. 2 is a partial, longitudinal, cross sectional view taken along line 2—2 of FIG. 1, showing the spherical bearing assembly incorporated in an end bell of the motor;

FIG. 3 is an enlarged, interior, elevational view of the bearing assembly looking along line 3—3 of FIG. 2;

FIG. 4 is an enlarged, exterior, elevational view of the bearing assembly, with the bearing cap removed, and is taken along line 4—4 of FIG. 2;

FIG. 5 is an enlarged cross-sectional view of the bearing assembly taken along line 5—5 of FIG. 3 or FIG. 4;

FIG. 6 is an elevational view of the leaf spring; and

FIG. 7 is a cross-sectional view of the leaf spring taken along line 7—7 of FIG. 6.

Referring to the drawing in more detail, an electric motor indicated at 10 has a stator 12, a rotor 14 mounted for rotation on a shaft 16, a casing 18, and end bells 20 (only one of which is shown). The end bell 20 has a central, integrally-formed hub portion, generally indicated at 22, comprising a cylindrical wall 24 concentric with the axis of the motor and a somewhat thicker transverse wall 26 within the cylindrical wall which is integral with the cylindrical wall and positioned intermediate of the ends thereof.

Wall 26 has a central circular aperture therein defined by a tapered wall 28 forming an annular seat and receiving a spherical surface portion at one end of a spherical bearing 30. Spherical bearing 30 has a bore 32 receiving the motor shaft 16. Hub portion 22 further includes a pair of diametrically opposite, arcuate abutments 34 extending inward from the bottom or interior end of the cylindrical wall 24. The inner surfaces of abutments 34 are spaced axially from the bearing supporting wall 26.

Overlying and engaging a spherical surface at the other end of spherical bearing 30 is a retaining leaf spring generally indicated at 36 and shown separately in FIGS. 6 and 7. Spring 36 comprises a central circular portion 38 having a concentric circular aperture 40 therein and surrounding flange 42 which forms a tapered annular seat and receives a spherical surface portion at the other end of spherical bearing 30. Leaf spring 36 further includes portions 44 which extend diametrically oppositely from central circular portion 38 and have their ends engaging the inner surfaces of abutments 34. The diameters of bearing seats 38 and 42 and the axial spacing of the inner surfaces of abutments 34 from wall 26 bear such relationship to the diameter of spherical bearing 30 that spring portions 44 are required to be flexed a predetermined amount when placing their ends in engagement with the inner surface of abutments 34.

The ends of extending spring portions 44 are arcuate, with a radius slightly less than that of the inside surface of cylindrical wall 22. Notches 46 in the ends of portions 44 receive lugs 48, which rise from the inner surface of abutments 34 to prevent inadvertent rotation of portions 44 from their assembled positions. The leaf spring 36 is further provided with stiffening flanges 50, see FIG. 7, to minimize flexing of its central portion 38. The leaf spring 36 is preferably constructed of steel spring stock, although any material suitable for the purpose may be employed.

The bearing assembly further includes a conventional bearing cap 52 and an oil retaining disc 54 of soft, felt-like material inserted between bearing supporting wall 26 and the arcuate abutment 34. The bearing support wall 26 has portions thereof cut away, as indicated at 56, to permit the application of lubricant to the disc 54.

In assembling the spherical bearing and retainer spring, the spherical bearing is placed upon its seat 28 and felt-like washer 54 is placed in position. Leaf spring 38 is then placed over the bearing with its flanged seat surface 42 engaging the spherical surface and with the end portions 44 perpendicular to their position shown in FIG. 3; that is, in a position in which the ends 44 are clear of the arcuate abutments 34. The portions 44 are then pressed inward and spring 38 is rotated to the position shown in FIG. 3. A spanner tool having portions engaging the notches 46 may be used for this operation.

Other configurations of the high-rate leaf spring, the abutments which retain it in a stressed condition, and the detent means retaining it in assembled position which lie within the spirit of the invention will occur to those skilled in the art. The embodiment shown and described is intended to be illustrative and not limiting, the scope of the invention being defined in the appended claims.

I claim:

1. In a spherical bearing assembly, a bearing retaining member having a cylindrical wall, where the inner wall surface thereof has an integrally formed transverse wall within said cylindrical wall, a first annular seat formed in said transverse wall, a spherical bearing having a spherical surface near one end thereof engaging said seat, a plurality of circularly spaced, integrally formed lugs projecting inward from said cylindrical wall surface having abutment surfaces, a high-rate leaf spring having a central portion, an aperture in said central portion defined by a second annular seat in engagement with a spherical surface portion of said bearing near its other end, said leaf spring having portions projecting radially from said central portion with the outer ends thereof lying within said cylindrical wall and engaging said abutment surfaces, said abutment surfaces being so spaced axially from said transverse wall as to require said radially projecting spring portions to be flexed when in engagement therewith, and the spacing between said circularly spaced lugs being such as to permit said radially extending spring portions to be flexed when positioned between said lugs so they may be rotated in a flexed condition into engagement with said abutment surfaces.

2. The bearing assembly claimed in claim 1 in which the said central portion of said leaf spring is circular, in which the width of said radially projecting leaf spring portions is less than the diameter of said central circular portion, in which said projecting leaf spring portions have arcuate outer edges, and in which said lugs constitute arcuate ledges projecting radially inward from said inner cylindrical wall.

3. The bearing assembly claimed in claim 1 which further includes means at the outer ends of said radially extending leaf spring portions cooperating with means on said abutments to detain rotation of said leaf spring from a position of engagement with said abutments.

4. The bearing assembly claimed in claim 1 wherein said radially extending portions of said leaf spring are provided with re-entry slots in their outer ends, which slots receive bosses rising from said abutment surfaces to detain the ends of said extending portions in engagement with said abutment surfaces.

5. The bearing assembly claimed in claim 1 in which said leaf spring comprises a central circular portion in which said central aperture is formed, said central circular portion having a diameter greater than the width of said radially extending leaf spring portions, and in which said central circular portion is provided with a peripheral stiffening flange.

* * * * *